(12) United States Patent
Suzuki et al.

(10) Patent No.: US 9,146,999 B2
(45) Date of Patent: Sep. 29, 2015

(54) SEARCH KEYWORD IMPROVEMENT APPARATUS, SERVER AND METHOD

(75) Inventors: Masaru Suzuki, Kawasaki (JP); Tomoharu Kokubu, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 843 days.

(21) Appl. No.: 12/372,570

(22) Filed: Feb. 17, 2009

(65) Prior Publication Data

US 2009/0248674 A1    Oct. 1, 2009

(30) Foreign Application Priority Data

Mar. 27, 2008    (JP) ................... 2008-083424

(51) Int. Cl.
   *G06F 7/00*    (2006.01)
   *G06F 17/30*    (2006.01)

(52) U.S. Cl.
   CPC ............................... *G06F 17/30867* (2013.01)

(58) Field of Classification Search
   None
   See application file for complete search history.

(56) References Cited

U.S. PATENT DOCUMENTS

| | | | | | |
|---|---|---|---|---|---|
| 5,864,846 | A | * | 1/1999 | Voorhees et al. ................ | 1/1 |
| 6,041,323 | A | * | 3/2000 | Kubota ................ | 1/1 |
| 7,827,170 | B1 | * | 11/2010 | Horling et al. ................ | 707/722 |
| 8,245,127 | B2 | * | 8/2012 | Griffith et al. ................ | 715/230 |
| 2002/0078044 | A1 | * | 6/2002 | Song et al. ................ | 707/6 |
| 2002/0078045 | A1 | * | 6/2002 | Dutta ................ | 707/7 |
| 2002/0178152 | A1 | * | 11/2002 | Azzam ................ | 707/3 |
| 2004/0039657 | A1 | * | 2/2004 | Behrens et al. ................ | 705/26 |
| 2004/0210558 | A1 | * | 10/2004 | Endo et al. ................ | 707/1 |
| 2004/0236737 | A1 | * | 11/2004 | Weissman et al. ................ | 707/4 |
| 2004/0243565 | A1 | * | 12/2004 | Elbaz et al. ................ | 707/3 |
| 2005/0289103 | A1 | * | 12/2005 | Bier ................ | 707/1 |
| 2005/0289456 | A1 | * | 12/2005 | Bier ................ | 715/513 |
| 2006/0026128 | A1 | * | 2/2006 | Bier ................ | 707/3 |
| 2006/0053154 | A1 | * | 3/2006 | Yano ................ | 707/102 |

(Continued)

FOREIGN PATENT DOCUMENTS

| | | |
|---|---|---|
| JP | 6-259479 A | 9/1994 |
| JP | 2002-288215 A | 10/2002 |
| JP | 2006-079366 A | 3/2006 |

OTHER PUBLICATIONS

Kelly D. et al., Implicit Feedback for Inferring User Preference: A Bibliography, Fall 2003, vol. 37 issue 2, pp. 1-11.*

(Continued)

*Primary Examiner* — Taelor Kim
(74) *Attorney, Agent, or Firm* — Ohlandt, Greeley, Ruggiero & Perle, L.L.P.

(57) ABSTRACT

A search keyword improvement apparatus includes a unit extracting a word as an additional keyword candidate from a new document, number of times of appearance of the word in the new document being greater than number of times of appearance of the word in each of a first documents except for the new document, if the new document and a new search target identification information item which is used to search the new document are accumulated, a unit generating a first search query based on an input keyword, a second search target associated with the input keyword, and one of the additional keywords, and generating a second search query, a unit moving the additional keyword candidate and the third search target identification information item, if the desired search result is selected from a third search result list corresponding to the second search query.

13 Claims, 12 Drawing Sheets

(56) References Cited

U.S. PATENT DOCUMENTS

| | | | |
|---|---|---|---|
| 2006/0080276 A1 | 4/2006 | Suzuki et al. | 707/1 |
| 2006/0190435 A1* | 8/2006 | Heidloff et al. | 707/3 |
| 2007/0100797 A1* | 5/2007 | Thun et al. | 707/3 |
| 2007/0198459 A1* | 8/2007 | Boone et al. | 707/1 |
| 2007/0198501 A1* | 8/2007 | Sundaranatha | 707/4 |
| 2010/0070448 A1* | 3/2010 | Omoigui | 706/47 |
| 2011/0055192 A1* | 3/2011 | Tang et al. | 707/706 |
| 2011/0119246 A1* | 5/2011 | Loftus et al. | 707/706 |
| 2014/0095495 A1* | 4/2014 | Brukman et al. | 707/732 |

OTHER PUBLICATIONS

Eguchi et al., Adaptive and Incremental Query Expansion for Cluster-based Browsing, 1999, DASFAA '99 Proceedings of the Sixth International Conference on Database Systems for Advanced Applications, pp. 25-34.*

Ichimura, et al., "A Study of the Relations among Question Answering, Japanese Named Entity Extraction, and Named Entity Taxonomy", IPSJ SIG Technical Report, May 13, 2004, pp. 17-24 (with English Abstract).

Japanese Office Action Dated Sep. 25, 2012 from corresponding JP Patent Appln. No. 2008-083424, 4 pages.

Eguchi, et al.; "Incremental Query Expansion Considering Adaptation to User's Behavior on the WWW"; Information Processing Society Research Report, Japan, Information Processing Society of Japan, Sep. 12, 1997, vol. 97, No. 86, pp. 75-82.

Ishitani, et al.; "Interactive Human Interface for Information Retrieval based on Semantic Pattern Analysis and Intension Understanding"; Institute of Electronics, Information and Communication Engineers Technical Search Report, Japan, Institute of Electronics, Information and Communication Engineers, Mar. 8, 2007, vol. 106, No. 605, pp. 7-12.

* cited by examiner

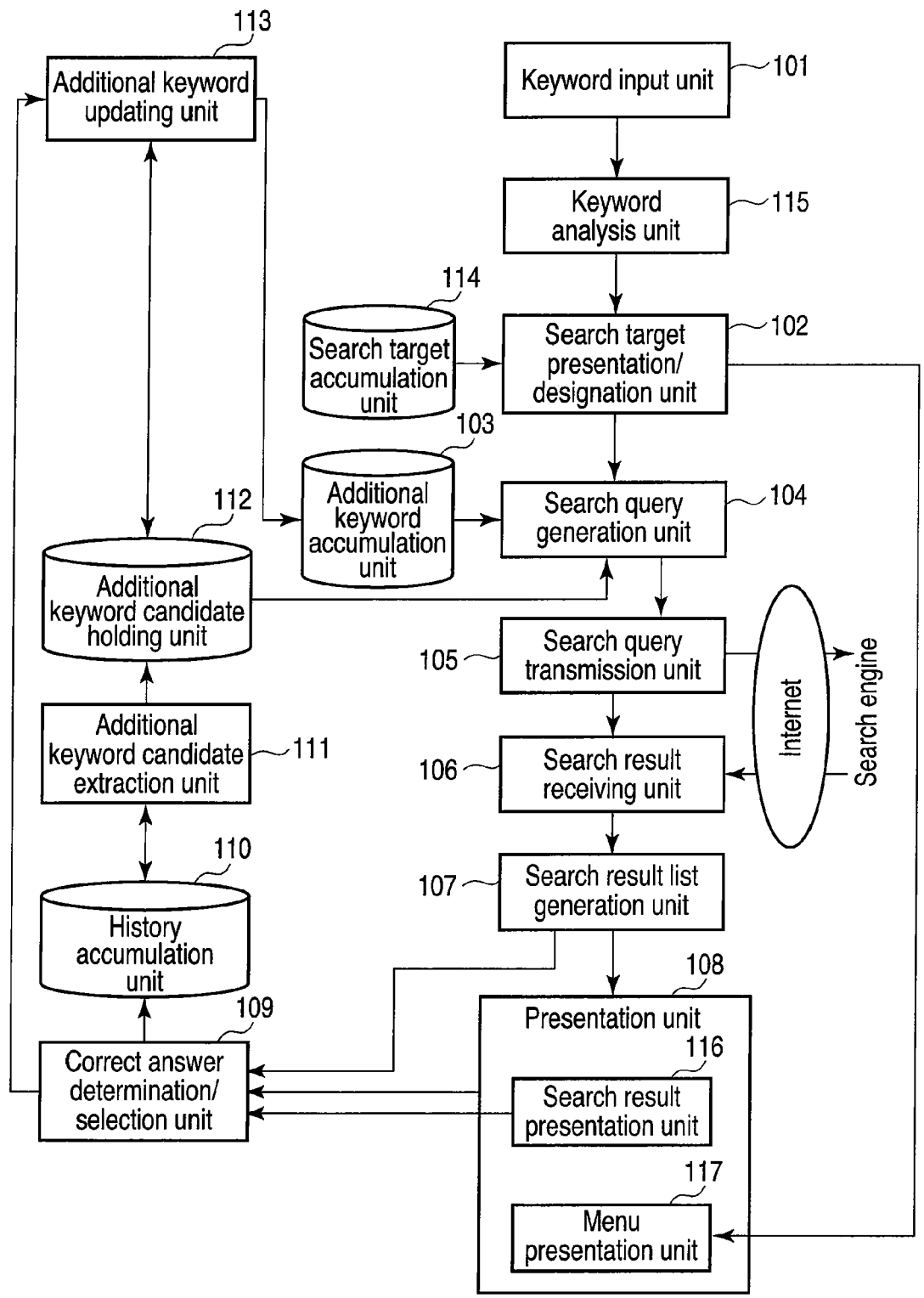
F I G. 1

| Search target ID | Search target |
|---|---|
| T001 | Search for map |
| T002 | Search for stock information |
| T003 | Search for reputation |
| T004 | Search for news |
| T005 | Search for time table |
| T006 | Search for prices |

| Search target ID | Additional keyword |
|---|---|
| T001 | Map, direction, location |
| T002 | IR |
| T003 | Report, review, statement, rating, evaluation |
| T004 | News |
| T005 | Time table, flight schedule |
| T006 | Compare prices, rate, fee |

501

| Search target ID | Additional keyword candidate |
|---|---|
| T001 | Neighborhood map |
| T002 | Shareholder special benefit plan |

| Rank | Title | URL |
|---|---|---|
| 1 | How to get to Tokyo park | http://www.xxx.jp/... |
| 2 | Book selling [Tokyo park guide map] | http://www.yyy.co.jp/... |
| 3 | Tokyo park/review | http://review.zzz.ne.jp/... |
| 4 | Tokyo park official site | http://www.tp.xx.jp/ |
| 5 | Hot place to visit [Tokyo park] | http://www.xyz.jp/... |
| : | : | : |

FIG. 7A

| Rank | Title | URL |
|---|---|---|
| 1 | Tokyo park neighborhood map | http://www.tp.xx.jp/map/ |
| 2 | Book selling [Tokyo park guide map] | http://www.yyy.co.jp/... |
| 3 | Hot place to visit [Tokyo park] | http://www.xyz.jp/... |
| 4 | How to get to Tokyo park | http://www.xxx.jp/... |
| 5 | Tokyo park restaurant map | http://restaurant.zz.jp/... |
| : | : | : |

FIG. 7B

| Rank | Title | URL | Source |
|---|---|---|---|
| 1 | How to get to Tokyo park | http://www.xxx.jp/... | 1 |
| 2 | Tokyo park neighborhood map | http://www.tp.xx.jp/map/ | 2 |
| 3 | Book selling [Tokyo park guide map] | http://www.yyy.co.jp/... | 1 |
| 4 | Tokyo park restaurant map | http://restaurant.zz.jp/... | 2 |
| 5 | Tokyo park/review | http://review.zzz.ne.jp/... | 1 |
| 6 | Tokyo park official site | http://www.tp.xx.jp/ | 1 |
| 7 | Hot place to visit [Tokyo park] | http://www.xyz.jp/... | 1 |
| ⋮ | ⋮ | ⋮ | |

FIG. 9

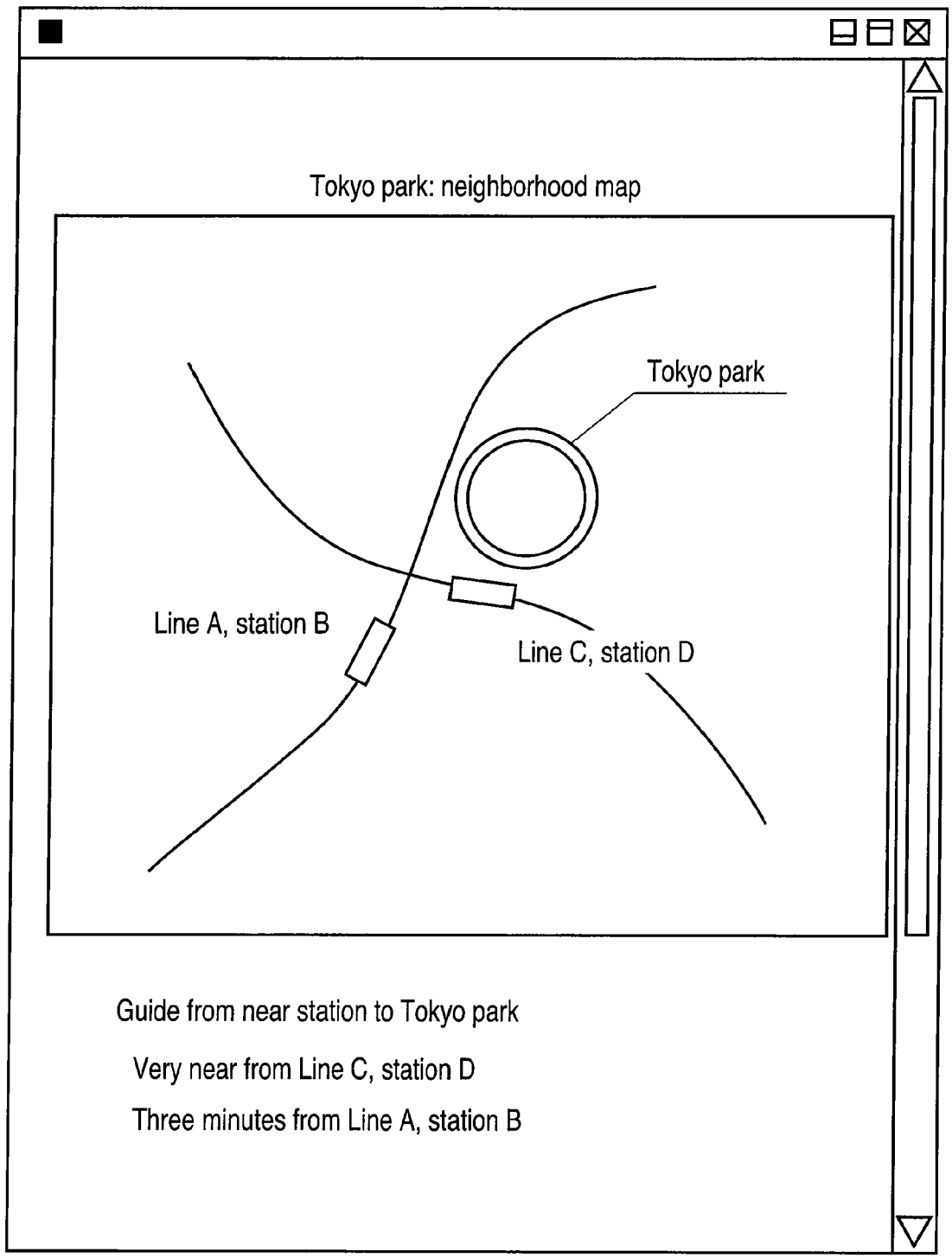
F I G. 11

| Search target ID | Title | Main text |
|---|---|---|
| T002 | ... | ... |
| T004 | ... | ... |
| T001 | Tokyo park neighborhood map | Tokyo park: neighborhood map<br>Guide from near station to Tokyo park<br>Very near from Line C, station D<br>Three minutes from Line A, station B<br>: |

FIG. 13

| Search target ID | Additional keyword | |
|---|---|---|
| T001 | Map, direction, location, neighborhood map | ~1401 |
| T002 | IR | |
| T003 | Report, review, statement, rating, evaluation | |
| T004 | News | |
| T005 | Time table, flight schedule | |
| T006 | Compare prices, rate, fee | |

FIG. 14

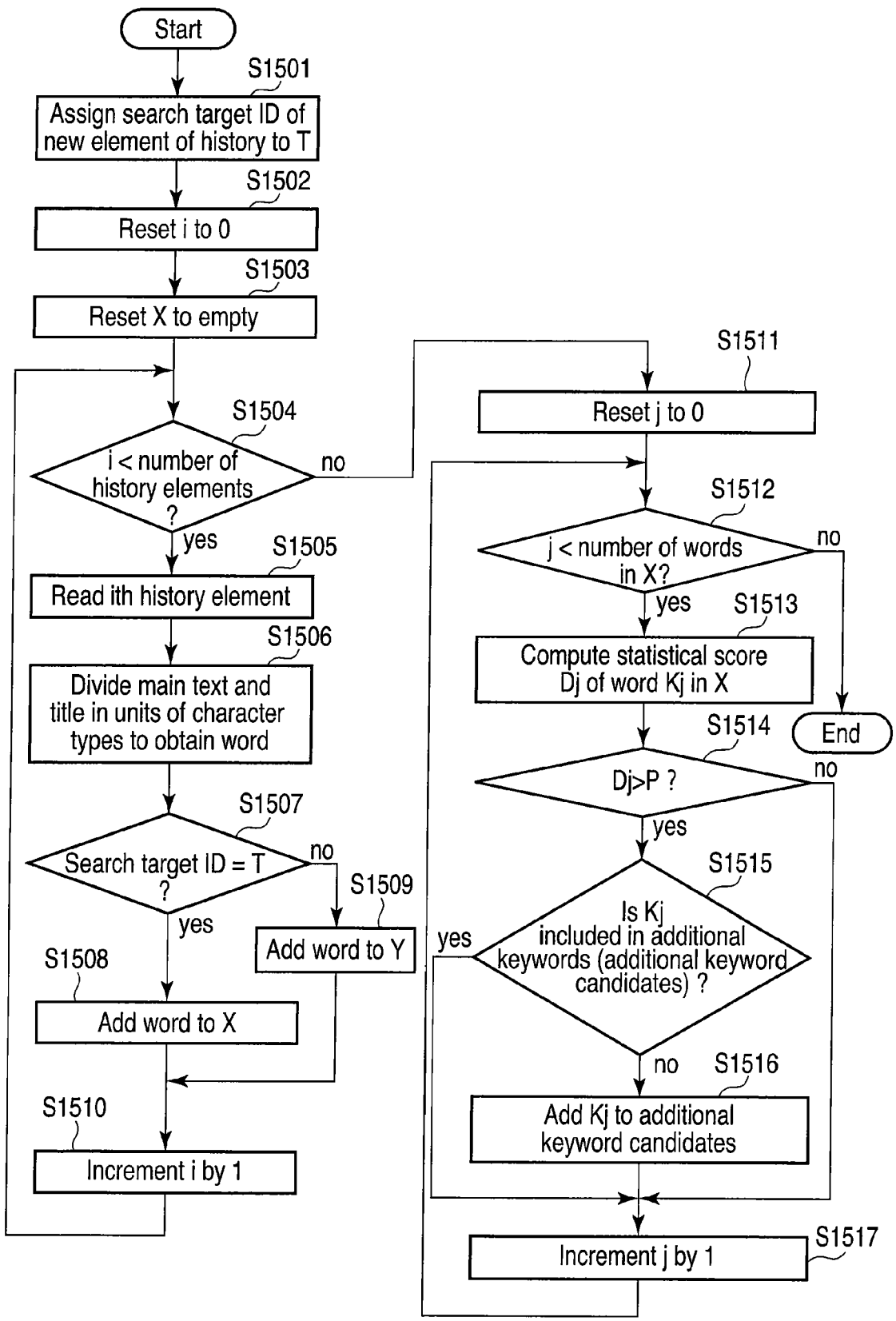
F I G. 15

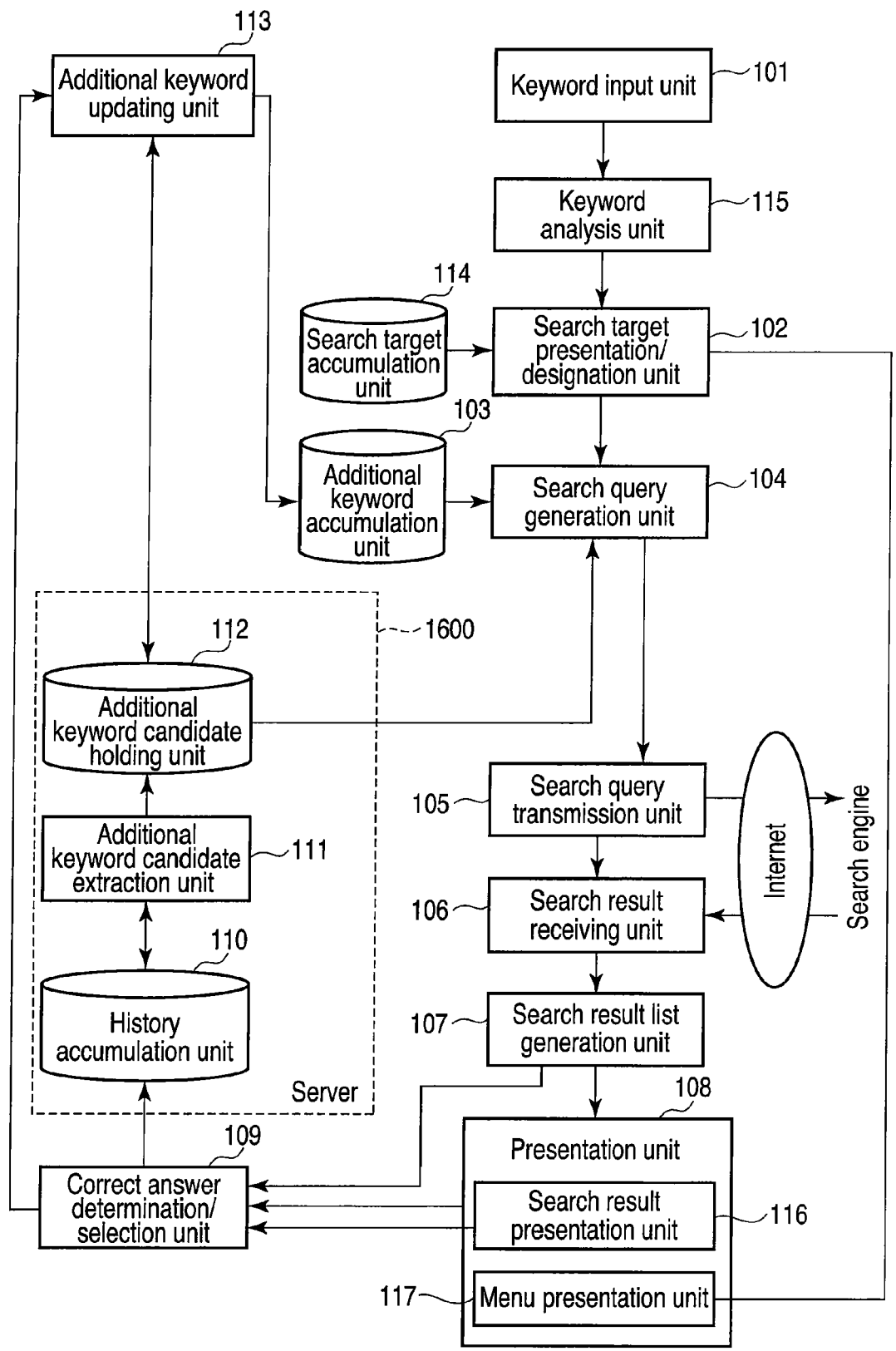
F I G. 16

SEARCH KEYWORD IMPROVEMENT APPARATUS, SERVER AND METHOD

CROSS-REFERENCE TO RELATED APPLICATIONS

This application is based upon and claims the benefit of priority from prior Japanese Patent Application No. 2008-083424, filed Mar. 27, 2008, the entire contents of which are incorporated herein by reference.

BACKGROUND OF THE INVENTION

1. Field of the Invention

The present invention relates to an information search field, and more particularly to a search keyword improvement apparatus, server and method, which enable appropriately narrowed information to be searched for by expanding a keyword input by a user for information search.

2. Description of the Related Art

As a technique of performing information search by a simple operation, there is known a technique of acquiring an auxiliary keyword from a co-occurrence ratio keyword database, based on a keyword designated by a user, and performing a search using the designated keyword and auxiliary keyword (see, for example, JP-A 2006-79366 (KOKAI)).

Since in the conventional technique, defined keywords are not updated, an accurate search result may not be acquired when, for example, the property of documents as search targets is changed or new documents appear.

BRIEF SUMMARY OF THE INVENTION

In accordance with an aspect of the invention, there is provided a search keyword improvement apparatus comprising: a history accumulation unit configured to accumulate a plurality of first documents or indexes which correspond to the first documents, and a plurality of first search target identification information items which correspond to first search targets associated with keywords for searching, in relationship to each other, the first search target identification information items being used to search the first documents; an extraction unit configured to extract a word, as an additional keyword candidate from a new document included in the first documents, number of times of appearance of the word in the new document being greater than number of times of appearance of the word in each of the first documents except for the new document, if the new document and a new search target identification information item which is used to search the new document are accumulated in the history accumulation unit; an additional keyword accumulation unit configured to accumulate a plurality of additional keywords different from the additional keyword candidate and a plurality of second search target identification information items corresponding to the additional keywords; a storage unit configured to store the additional keyword candidate and a third search target identification information item corresponding to the additional keyword candidate; a query generation unit configured to generate a first search query based on an input keyword, a second search target associated with the input keyword, and one of the additional keywords which corresponds to a fourth search target identification information item corresponding to the second search target, and configured to generate a second search query based on the input keyword, the second search target, and the additional keyword candidate which corresponds to the fourth search target identification information item; a list generating unit configured to generate a first search result list including search results corresponding to the first search query and the second search query; a first selection unit configured to select a second document as a desired search result from the first search result list; and a moving unit configured to move, to the additional keyword accumulation unit, the additional keyword candidate and the third search target identification information item, if the first selection unit selects the desired search result from a second search result list corresponding to the second search query, the second search result list being included in the first search result list.

In accordance with another aspect of the invention, there is provided a server apparatus comprising: a history accumulation unit configured to accumulate a plurality of first documents selected as desired search results from a search result list formed of a plurality of search results, and a plurality of search target identification information items which correspond to search targets associated with keywords for searching, in relationship to each other, the search target identification information items being used to search the first documents; an extraction unit configured to extract a word, as an additional keyword candidate from a new document included in the first documents, number of times of appearance of the word in the new document being greater than number of times of appearance of the word in each of the first documents except for the new document, if the new document and a new search target identification information item which is used to search the new document are accumulated in the history accumulation unit; and a storage unit configured to store the additional keyword candidate and another search target identification information item corresponding to the additional keyword candidate.

BRIEF DESCRIPTION OF THE SEVERAL VIEWS OF THE DRAWING

FIG. 1 is a block diagram illustrating a search keyword improvement apparatus according to an embodiment;

FIG. 6 is a table illustrating a content example of the additional keyword candidate holding unit shown in FIG. 1;

FIG. 7A is a table illustrating a first search result included in search results received by the search result receiving unit shown in FIG. 1;

FIG. 7B is a table illustrating a second search result included in the search results;

FIG. 9 is a view illustrating an example of a search result list generated by the search result list generation unit shown in FIG. 1;

FIG. 11 is a view illustrating an example of a text as a search result presented by the search result presentation unit shown in FIG. 1 when an item indicated by reference number 1001 is selected in FIG. 10;

FIG. 13 is a table illustrating an example of a history accumulated in the history accumulation unit 110 shown in FIG. 1;

FIG. 14 is a table illustrating a content example accumulated in the additional keyword accumulation unit and updated by the additional keyword updating unit shown in FIG. 1;

FIG. 15 is a flowchart illustrating an operation example of the additional keyword candidate extraction unit shown in FIG. 1; and FIG. 16 is a block diagram illustrating a search keyword improvement apparatus and server according to a modification of the embodiment.

DETAILED DESCRIPTION OF THE INVENTION

Figures 2, 3:
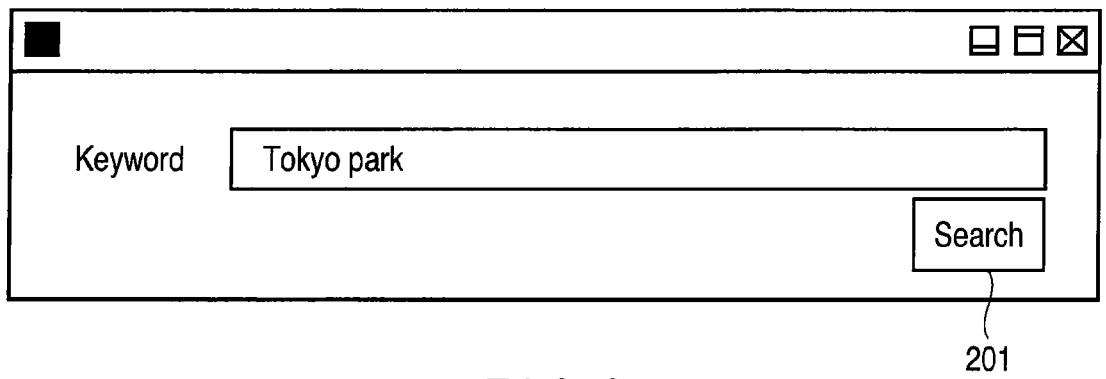
FIG. 2 is a view illustrating an example of the input screen of the keyword input unit shown in FIG. 1.
FIG. 3 is a table showing a content example of the search target accumulation unit shown in FIG. 1.

A search keyword improvement apparatus and server according to an embodiment will be described in detail with reference to the accompanying drawings. In the following description, like reference numbers denote like elements, and duplicate description will be avoided.

The embodiment is directed to an Internet search assisting apparatus that provides users with a user interface as software operable on a user's PC for Internet search and used to access a service on the Internet, called a search engine.

The search keyword improvement apparatus, server and method of the embodiment can acquire accurate search results.

Referring to FIG. 1, the search keyword improvement apparatus of the embodiment will be described.

The search keyword improvement apparatus of the embodiment comprises a keyword input unit 101, search target presentation/designation unit 102, additional keyword accumulation unit 103, search query generation unit 104, search query transmission unit 105, search result receiving unit 106, search result list generation unit 107, presentation unit 108, correct answer determination/selection unit 109, history accumulation unit 110, additional keyword candidate extraction unit 111, additional keyword candidate holding unit 112, additional keyword updating unit 113, search target accumulation unit 114, and keyword analysis unit 115. The presentation unit 108 includes a search result presentation unit 116 and menu presentation unit 117.

The keyword input unit 101 accepts user's input of a keyword that serves as a clue to search. A keyword may be input using a text box form as an existing software component for accepting input of a character using a keyboard. Alternatively, a string of characters selected from a document displayed on a screen, using a pointing device such as a mouse, may be used as a keyword. A screen example of the keyword input unit 101 will be described later with reference to FIG. 2.

The search target accumulation unit 114 accumulates candidates for search targets related to keywords. Each search target is used to search for a document. A content example of the search target accumulation unit 114 will be described later with reference to FIG. 3.

The keyword analysis unit 115 analyzes the semantic class of each keyword input through the keyword input unit 101, and transfers the analysis result to the search target presentation/designation unit 102. The types of semantic classes analyzed by the keyword analysis unit 115 are preset. In the embodiment, for example, "Person name," "Company name," "Station name," "Facilities name" and "Place name" are set as preset semantic classes. The keyword analysis unit 115 is realized by a known intrinsic representation extraction method (recited in, for example, "A Study of the Relations among Question Answering, Japanese Named Entity Extraction, and Named Entity Taxonomy," written by Yumi Ichimura et al. in IPSJ SIG Technical Report, NL-161-3, 2004). Therefore, no detailed description will be given thereof.

The search target presentation/designation unit 102 reads, from the search target accumulation unit 114, a plurality of candidates for a search target related to the analysis result of the keyword analysis unit 115, and presents the read candidates using the menu presentation unit 117 incorporated in the presentation unit 108. The unit 102 also receives user's designation of a desired search target. Preset candidates may be presented for each presented search target. Alternatively, candidates narrowed based on the meaning of an input keyword may be presented. A screen example presented by the menu presentation unit 117 will be described later with reference to FIG. 4.

Figures 4, 5:
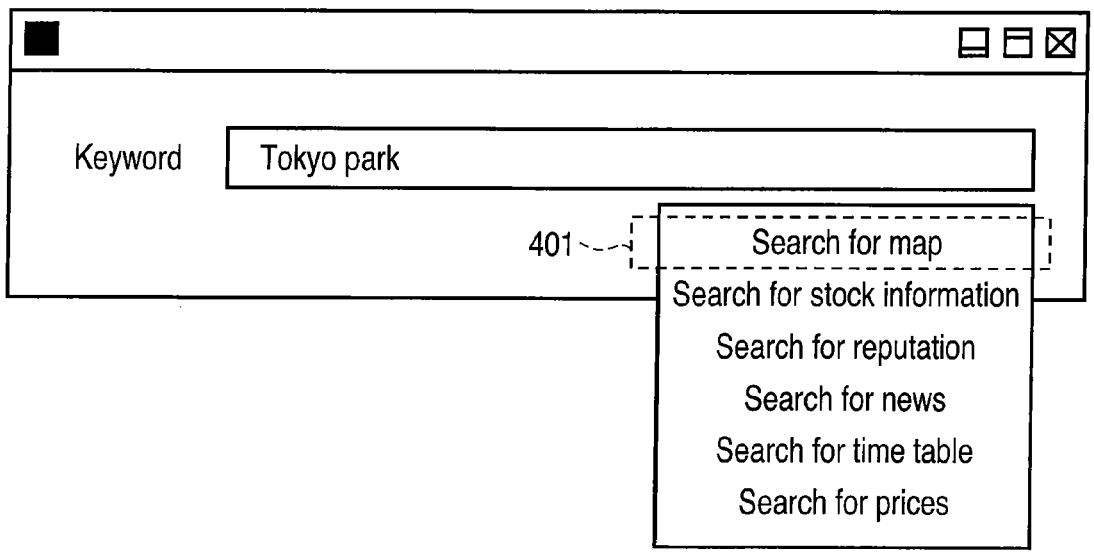
FIG. 4 is a view illustrating a display screen example presented by the search target presentation/designation unit shown in FIG. 1.
FIG. 5 is a table illustrating a content example of the additional keyword accumulation unit shown in FIG. 1.

The additional keyword accumulation unit 103 accumulates, for each search target, additional keywords to be added to keywords input by a user, to enable each search target to be appropriately searched for. FIG. 5 shows a content example of the additional keyword accumulation unit 103.

The search query generation unit 104 reads, from the additional keyword accumulation unit 103, additional keywords corresponding to a search target designated by the search target presentation/designation unit 102, and combines them with a keyword input to the keyword input unit 101 to generate a search query in accordance with a preset format. The search query generation unit 104 may read, from the additional keyword candidate holding unit 112, described later, additional keywords different from those accumulated in the additional keyword accumulation unit 103, to generate a plurality of search queries. More particulars concerning the search query generation unit 104 will be described later with reference to FIGS. 5 and 6.

When the search query generation unit 104 has generated a plurality of search queries, the search query transmission unit 105 sequentially transmits the queries to a search service. For instance, the search query transmission unit 105 transmits the queries to an existing search service, called a search engine, via the Internet. The search query transmission unit 105 may access different search engines in units of search targets designated by the user. Further, it is not always necessary to connect the search query transmission unit 105 to a search service on the Internet. The search query transmission unit 105 may be connected to a search engine, called a desktop search engine, for searching for files stored in a local PC hard disk, or to a database management system on an intranet. The search query transmission unit 105 will be described later in detail with reference to FIG. 6.

The search result receiving unit 106 reads a result of search executed by an external search engine. If the search query transmission unit 105 has transmitted a plurality of search queries to the search engine, the search result receiving unit 106 sequentially reads the results of search corresponding to the queries from the search engine. The search result receiving unit 106 will be described later in detail with reference to FIGS. 6, 7A and 7B.

The search result list generation unit 107 generates a search result list based on the search result(s) read by the search result receiving unit 106. When the search result receiving unit 106 has read a plurality of search results, these search results are combined into a single search result list. A method of combining a plurality of search results will be described later with reference to FIGS. 8 and 9.

Based on the search result list generated by the search result list generation unit 107, the search result presentation unit 116 incorporated in the presentation unit 108 presents, to the user, the title, URL or summary of each search result, and presents the main text of a search result corresponding to a document designated by the user. The main text of each search result may be acquired by the search result receiving unit 106 via the Internet. Alternatively, the search result presentation unit 116 may directly access the Internet to acquire the main text when the user has selected any one of the search results. A search result list example presented by the search result presentation unit 116 will be described later with reference to FIGS. 10 and 11.

The correct answer determination/selection unit 109 monitors a user's operation on the search result presentation unit 116, determines which document in the search result list is a user's desired one, based on the information acquired by monitoring, and selects the desired search result. Thus, the correct answer determination/selection unit 109 selects a document as a desired search result from the search result list obtained by combining a plurality of search results. Further, the correct answer determination/selection unit 109 acquires a search list from the search result list generation unit 107.

The determination process by the correct answer determination/selection unit 109 will be described later in detail with reference to FIG. 12. The correct answer determination/selection unit 109 may select only one document as a user's desired one, may select a plurality of documents as user's desired ones, or may determine that none of the search results is a user's desired one. The process, by the correct answer determination/selection unit 109, of sending an instruction to the additional keyword updating unit 113 will be described later in detail with reference to FIG. 12.

The history accumulation unit 110 accumulates the determination results of the correct answer determination/selection unit 109. Specifically, the history accumulation unit 110 accumulates information indicating the search targets designated by the user, and the main texts of the documents determined to be user's desired ones (i.e., determined correct). The history accumulation unit 110 may accumulate URLs as indexes associated with the documents determined correct, instead of the main texts of the documents. Further, the history accumulation unit 110 instructs the additional keyword updating unit 113 to update additional keywords when the search query generation unit 104 has generated a plurality of search queries and the document determined correct by the correct answer determination/selection unit 109 corresponds to only one of the queries, or when an element included in a search result list corresponding to one of the search queries assumes a higher rank than the same element included in a search result list corresponding to the other search query. A content example of the history accumulation unit 110 is shown in FIG. 13.

Upon receiving an instruction from the correct answer determination/selection unit 109, the additional keyword updating unit 113 transmits, to the additional keyword accumulation unit 103, the additional keyword candidates that are included in the additional keyword candidates held in the additional keyword candidate holding unit 112, and are selected by the correct answer determination/selection unit 109, thereby updating the additional keywords accumulated in the additional keyword accumulation unit 103. The additional keyword updating unit 113 will be described later in detail with reference to FIG. 14.

When the history accumulation unit 110 accumulates new history information, the additional keyword candidate extraction unit 111 performs statistical processing on the history information, determines which ones of the additional keywords corresponding to the search targets should be updated, and extracts new additional keyword candidates from the history accumulation unit 110. The process of the additional keyword candidate extraction unit 111 will be described later in detail with reference to FIG. 15.

The additional keyword candidate holding unit 112 holds (stores) the additional keyword candidates extracted by the additional keyword candidate extraction unit 111. FIG. 6 shows a content example of the additional keyword candidate holding unit 112.

Referring now to FIG. 2, a description will be given of a screen example of the keyword input unit 101.

FIG. 2 shows a case where the user has input keyword "Tokyo park." When the user has operated a search button 201 to input the keyword to the keyword input unit 101, the search target presentation/designation unit 102 reads, from the search target accumulation unit 114, IDs (identification data) corresponding to search target candidates associated with the keyword.

Referring then to FIG. 3, a description will be given of search target examples accumulated in the search target accumulation unit 114.

In FIG. 3, reference number 301, for example, denotes a search target written as "Search for map." If the input keyword indicates, for example, a place name or facilities name, the user selects this search target to search for map information corresponding to the keyword. Similarly, reference number 302 denotes a search target written as "Search for news." If the user wishes to search for news information associated with the input keyword, they select this search target.

Referring to FIG. 4, a description will be given of a screen example presented by the search target presentation/designation unit 102.

Assume here that the user selects a search target 401 written as "Search for map" in FIG. 4. Namely, assume that the user wishes to search for map information associated with the keyword "Tokyo park." When the user designates the search target, the search query generation unit 104 reads, from the additional keyword accumulation unit 103, additional keywords, using, as a key, search target ID (search target identification information) corresponding to the designated search target.

Referring then to FIG. 5, a description will be given of additional keyword examples accumulated in the additional keyword accumulation unit 103.

In the case of FIG. 5, the search query generation unit 104 reads, from the additional keyword accumulation unit 103, additional keywords "Map," "Direction" and "Location" (denoted by reference number 501 in FIG. 5) using, as a key, search target ID "T001" (denoted by reference number 303 in FIG. 3) corresponding to the designated search target "Search for map."

After that, the search query generation unit 104 generates a first search query, based on the keyword "Tokyo park" designated by the user, and the additional keywords read from the additional keyword accumulation unit 103. In this embodiment, the search query generation unit 104 connects additional keywords to each other by OR logic, and connects the thus-connected additional keywords to the user-input keyword by AND logic, thereby generating the resultant Boolean formula data as a search query. Namely, in the above-mentioned example, first search query "Tokyo park AND map OR location OR direction" is generated. The procedure of generating a search query is not limited to the above-mentioned one. For instance, a procedure of generating search queries suitable for respective search targets may be stored in the form of, for example, a script in the additional keyword accumulation unit 103, as well as additional keywords. In this case, the search query generation unit 104 reads the script and generates a first search query based on the read script.

After that, the search query generation unit 104 refers to the additional keyword candidate holding unit 112, detects therein additional keyword candidates corresponding to a search target designated by the user, using, as a key, the search target ID of the designated search target, and reads them.

Referring to FIG. 6, a description will be given of examples of additional keyword candidates held in the additional keyword candidate holding unit 112. A method of selecting additional keyword candidates held in the additional keyword candidate holding unit 112 will be described later with reference to FIG. 15.

In the embodiment, keyword "Neighborhood map" is held as an additional keyword candidate corresponding to search target ID "T001," and is read by the search query generation unit 104. After the search query generation unit 104 reads an additional keyword candidate or additional keyword candidates from the additional keyword candidate holding unit 112, it generates a second search query based on the read additional keyword candidate(s), in addition to the already generated first search query. In the embodiment, the search query generation unit 104 connects the additional keyword candidates by OR logic, and connects the connected additional keywords to the user-input keyword by AND logic, thereby generating the resultant Boolean formula data as a search query. In this example, since there is only one additional keyword candidate, it is not necessary to perform additional keyword candidate connection by OR logic, and hence second search query "Tokyo park AND neighborhood map" is generated.

The first and second search queries generated by the search query generation unit 104 are sent to the search query transmission unit 105. If no second search queries are generated, only the first search query is sent to the search query transmission unit 105, and the following processing is executed only on the first search query.

The search query transmission unit 105 converts the first and second search queries into a format that matches an existing search engine excluded from the embodiment, and transmits the resultant data to the search engine. The search query format matching the existing search engine on the Internet is publicly known, and hence is not described in detail.

Search results corresponding to the search queries sent from the search query transmission unit 105 are received by the search result receiving unit 106. At this time, the search result receiving unit 106 receives, from the search query transmission unit 105, information concerning the search queries sent therefrom to the search engine, and discriminates first and second search results corresponding to the first and second search queries, respectively, based on the information.

Referring to FIGS. 7A and 7B, a description will be given of examples of search results received by the search result receiving unit 106.

FIG. 7A shows an example of a first search result corresponding to a first search query, and FIG. 7B shows an example of a second search result corresponding to a second search query. FIGS. 7A and 7B show only ranks, titles and URLs as the search results. However, the main texts or abstracts of search result documents may be received as further elements of each search result. In addition, although FIGS. 7A and 7B show only search results of the first to fifth ranks, a greater number of elements may be added to each search result.

Figure 8:
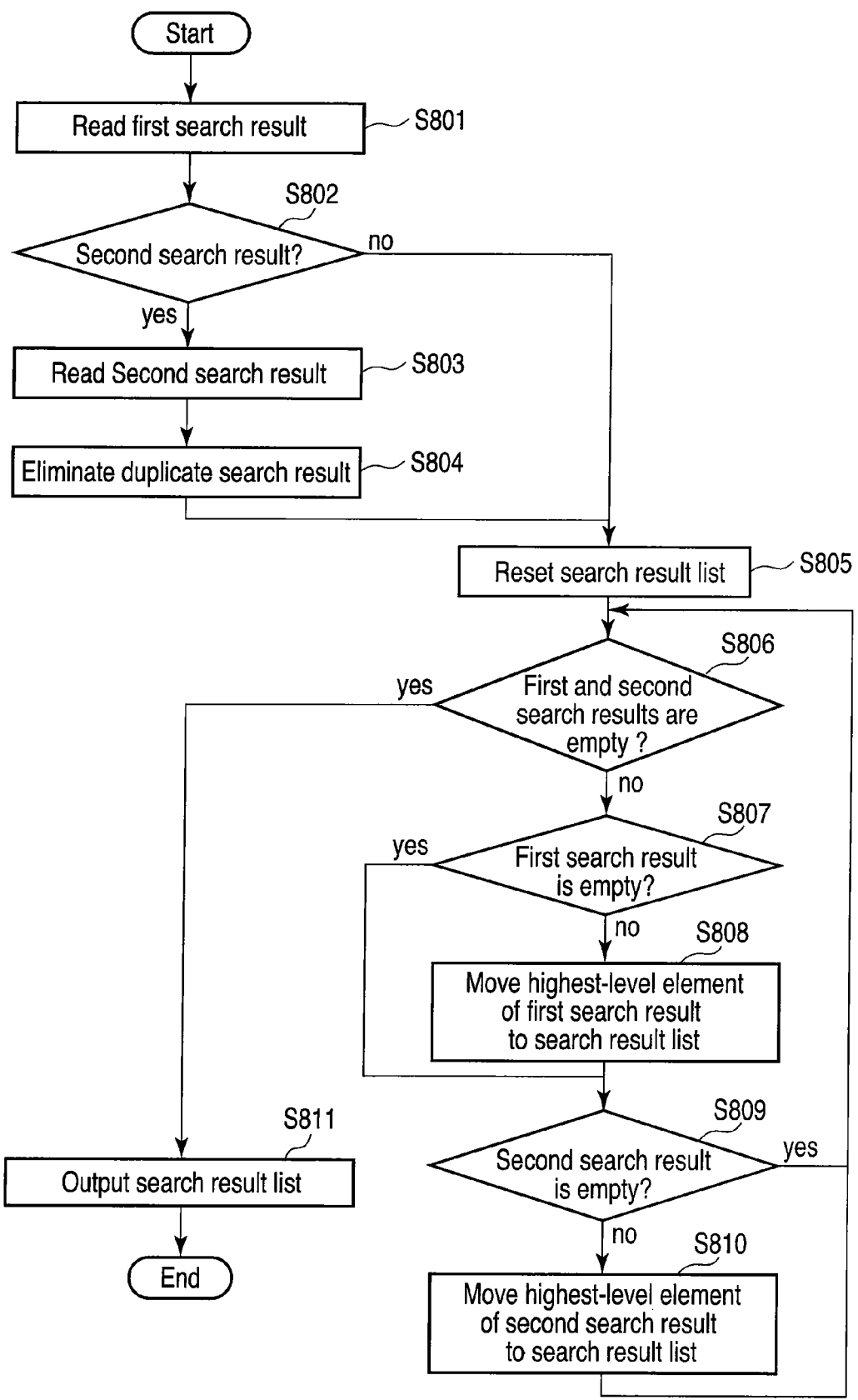
FIG. 8 is a flowchart illustrating an operation example of the search result list generation unit shown in FIG. 1.

Referring to FIG. 8, an operation example of the search result list generation unit 107 will be described.

The search result list generation unit 107 generates a search result list in accordance with the flowchart of FIG. 8, using, as an input, each search result received by the search result receiving unit 106.

(S801) A first search result (e.g., the content shown in FIG. 7A) is read from the search result receiving unit 106.

(S802) It is determined whether a second search result is received from the search result receiving unit 106. If the second search result is received, the program proceeds to step S803, whereas if it is not received, the program proceeds to step S805.

(S803) A second search result (e.g., the content shown in FIG. 7B) is read from the search result receiving unit 106.

(S804) A search result document included in the second search result read at step S803 and also included in the first search result is removed from the second search result.

(S805) The existing search result list is reset or deleted.

(S806) When the second search result is read at step S803, it is determined whether the first search result read at step S801 and the second search result read at step S803 are both empty. If they are both empty, the program proceeds to step S811, whereas if at least one of the first and second search results is not empty, the program proceeds to step S807.

If it is determined at step S802 that the second search result is not received, it is determined whether the first search result read at step S801 is empty. If it is determined that the first search result is empty, the program proceeds to step S811, whereas if it is determined that the first search result is not empty, the program proceeds to step S807.

(S807) It is determined whether the first search result read at step S801 is empty. If it is determined that the first search result is empty, the program proceeds to step S809, whereas if it is determined that the first search result is not empty, the program proceeds to step S808.

(S808) The highest-level element of the first search result read at step S801 is moved to a search result list.

(S809) It is determined whether the second search result read at step S803 is empty. If it is determined that the second search result is empty, the program proceeds to step S806, whereas if it is determined that the second search result is not empty, the program proceeds to step S810.

(S810) The highest-level element of the second search result read at step S803 is moved to the search result list. After that, the program is returned to step S806.

(S811) The resultant search result list is output to the search result presentation unit 116.

Referring then to FIG. 9, a description will be given of an example of a search result list generated by the search result list generation unit 107.

The search result list shown in FIG. 9 is generated by the search result list generation unit 107 in accordance with the flowchart of FIG. 8, based on the first and second search results shown in FIG. 7. In the column "Source" in FIG. 9, "2" is recorded in cells corresponding to documents copied from the second search result, and "1" is recorded in the other cells.

Figure 10:
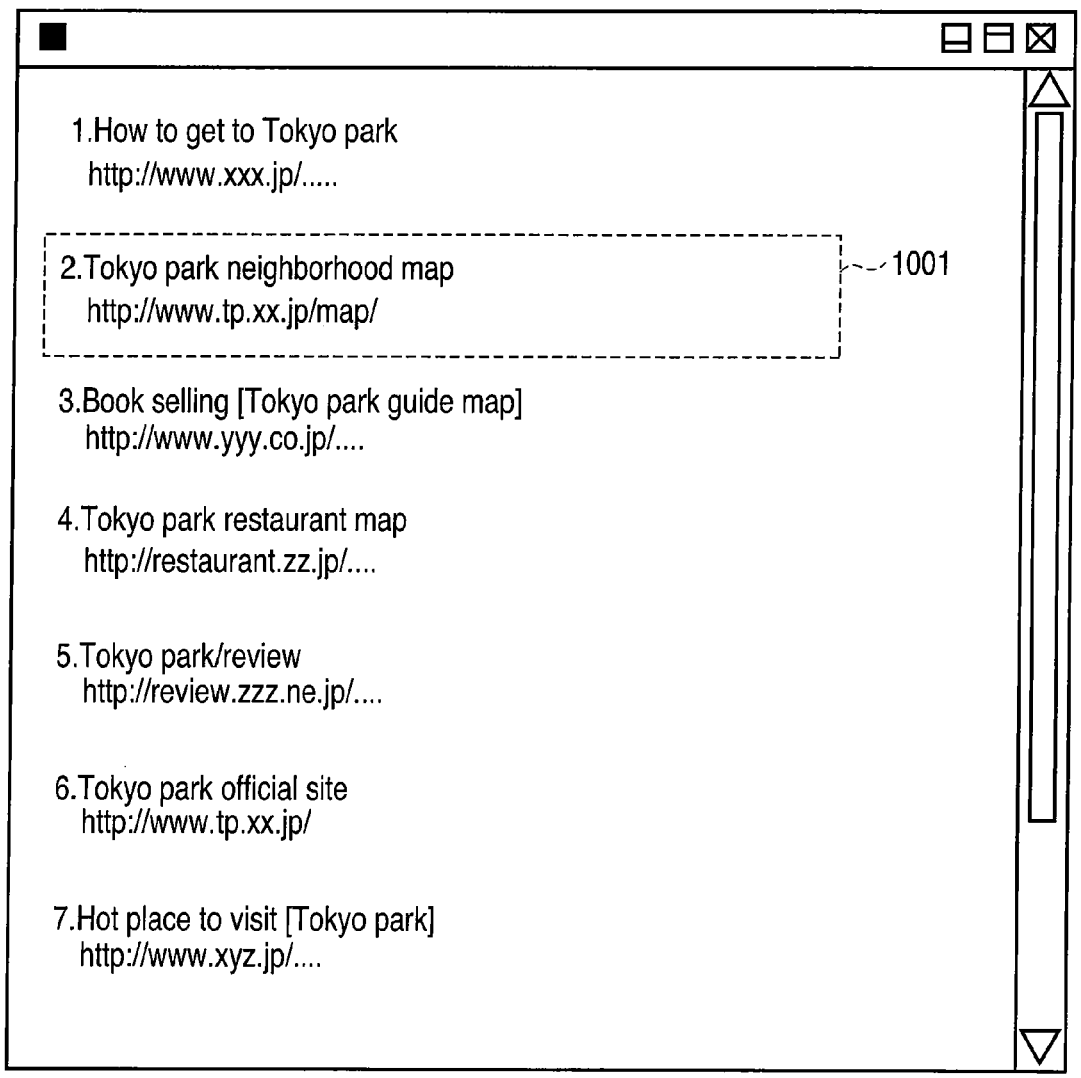
FIG. 10 is a view illustrating an example of a search result list presented by the search result presentation unit shown in FIG. 1.

Referring to FIG. 10, an example of a search result list presented by the search result presentation unit 116 will be described.

The search result presentation unit 116 reads the search result generated by the search result list generation unit 107, and presents the list to the user as shown in FIG. 10.

FIG. 10 shows, in order, the titles and URLs contained in the search result list. The titles and the respective URLs are linked by hyperlink so that when a user clicks each character string using a pointing device, such as a mouse, the search result presentation unit 116 connects the string to the corresponding URL using a known Internet connection technique, to thereby acquire the corresponding document and present the main text of the acquired document.

While seeing the search result list of FIG. 10, the user can detect which search result in the search result list corresponds to desired information, and select the title or URL regarded as appropriate. Assume here that since the user wants to search for a map related to "Tokyo park," they determine that the search result "Tokyo park neighborhood map" of the $2^{nd}$ rank indicated by reference number 1001 in FIG. 10 is their most desirable search result, and clicks the title or URL indicated by reference number 1001. FIG. 11 shows an example of a main text corresponding to the selected search result and presented by the search result presentation unit 116 when the title or URL indicated by reference number 1001 is clicked.

Figure 12:
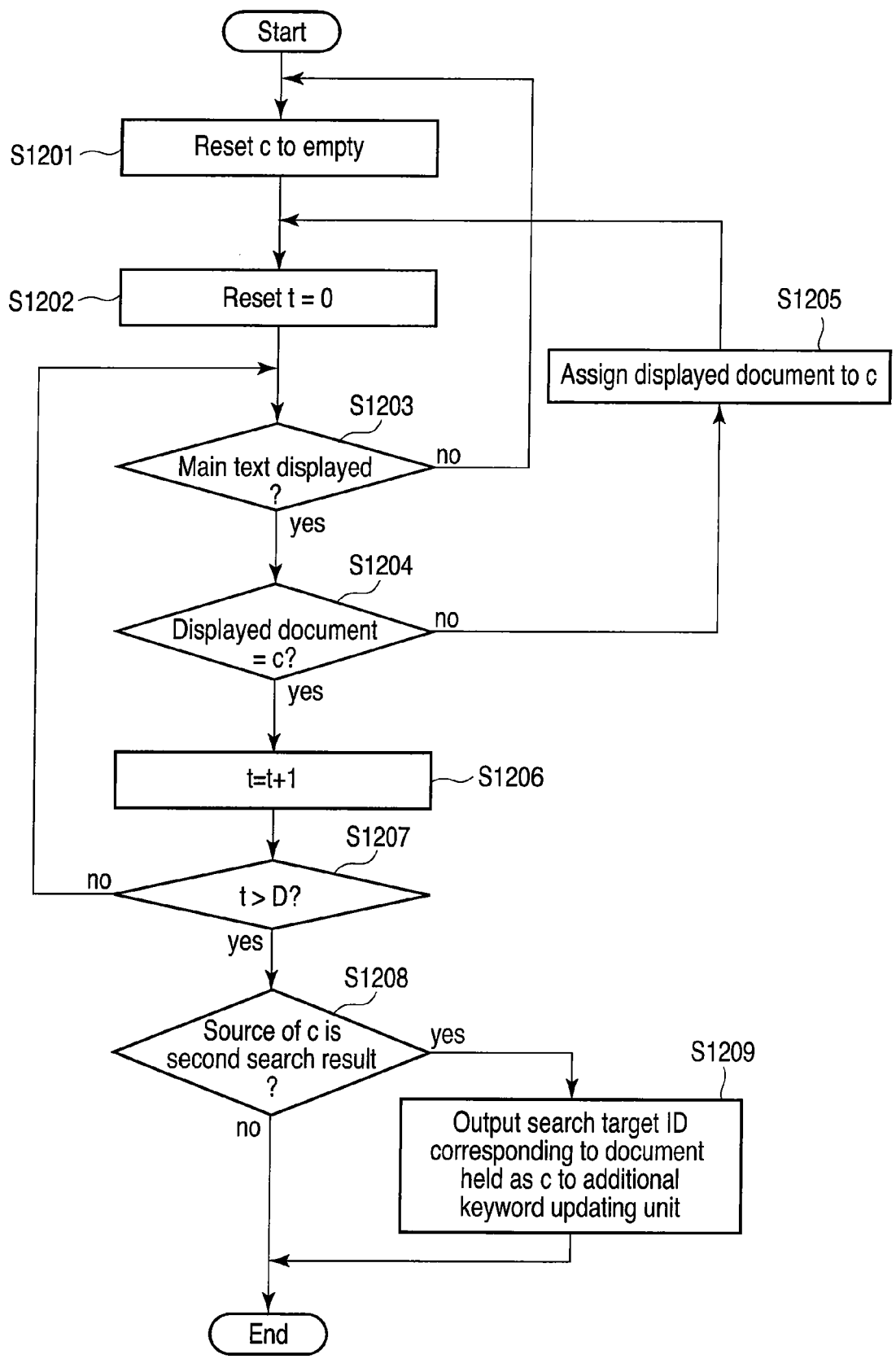
FIG. 12 is a flowchart illustrating an operation example of the correct answer determination/selection unit shown in FIG. 1.

Referring now to FIG. 12, an operation example of the correct answer determination/selection unit 109 will be described.

The correct answer determination/selection unit 109 monitors user's operations on the search result presentation unit 116, determines which one of the search results in the search result list the user has regarded as desirable, and selects the desirable search result.

(S1201) Variable c that holds a correct candidate is reset to the empty state.

(S1202) Timer variable t is reset to 0.

(S1203) It is determined whether the search result presentation unit 116 presents a main text. If it is determined that the main text is displayed, the program proceeds to step S1204, whereas if it is determined that no main text is displayed, the program returns to step S1201.

(S1204) It is determined whether the document presented by the search result presentation unit 116 is identical to that held in variable c. If it is determined that the presented document is not identical to that held in variable c, the program proceeds to step S1205.

(S1205) The document presented by the search result presentation unit 116 is assigned as a correct candidate to variable c.

(S1206) Timer variable t is incremented by 1.

(S1207) It is determined whether timer variable t is higher than a preset threshold value D. If it is determined that timer variable t is higher than the preset threshold value D, the program proceeds to step S1208, whereas if it is determined that timer variable t is not higher than the preset threshold value D, the program returns to the step S1203.

(S1208) It is determined whether the source of the search result element held in variable c is included in the second search result. If it is determined that the search result element is included in the second search result, the program proceeds to step S1209, whereas if the search result element is not included in the second search result, the process is terminated.

(S1209) The search target ID corresponding to the document held in variable c is output to the additional keyword updating unit 113.

As a result of the procedure shown in FIG. 12, the document, which is included in the documents having their main texts browsed by the user and has its main text browsed by the user for a preset time or more without browsing any other document, is determined correct. Assume here that the document with the main text shown in FIG. 11, i.e., the document corresponding to reference number 1001 in FIG. 10, is determined correct. If the document determined correct is only included in the second search result, namely, if the value of the "source cell" in FIG. 9 is 2, the correct answer determination/selection unit 109 transmits, to the additional keyword updating unit 113, the search target ID corresponding to the search target designated by the search target presentation/designation unit 102 (S1209). In this case, "T001" is sent as search target ID to the additional keyword updating unit 113.

Further, when the correct answer determination/selection unit 109 determines correct a certain document, the title, main text and search target ID of the document are accumulated in the history accumulation unit 110. FIG. 13 shows a history example accumulated in the history accumulation unit 110.

Referring to FIGS. 13 and 14, the additional keyword updating unit 113 will be described.

Upon receiving search target ID from the correct answer determination/selection unit 109, the additional keyword updating unit 113 reads, from the additional keyword candidate holding unit 112, an additional keyword candidate or additional keyword candidates corresponding to the received search target ID, and deletes the candidate(s) from the additional keyword candidate holding unit 112. In this example, the additional keyword updating unit 113 reads "Neighborhood map" (denoted by reference number 601 in FIG. 6) as an additional keyword candidate.

After that, the additional keyword updating unit 113 adds the additional keyword candidate, received from the additional keyword candidate holding unit 112, to the additional keywords corresponding to the search target ID and accumulated in the additional keyword accumulation unit 103. In this example, the item "Neighborhood map" is added to the additional keywords "Map, direction, location" (denoted by reference number 501 in FIG. 5) corresponding to search target ID "001" (S1401 in FIG. 14). Namely, when a correct document, which could not be detected in a search using an additional keyword, could be detected in a search using an additional keyword candidate, the additional keyword candidate is added as an additional keyword.

Referring to FIG. 15, a description will be given of an operation example of the additional keyword candidate extraction unit 111.

When a new history element is added to the history accumulation unit 110, the additional keyword candidate extraction unit 111 extracts new additional keyword candidates in accordance with the flowchart of FIG. 15.

(S1501) Search target ID as a newly added history element is assigned to variable T that holds search target ID. For instance, T is set to T001.

(S1502) Reset counter variable i to 0.

(S1503) Make empty variable X that holds a word arrangement.

(S1504) It is determined whether counter variable i is less than the number of history elements. If i is less than the number of history elements, the program proceeds to step S1505, whereas if i is not less than the number of history elements, the program proceeds to step S1511.

(S1505) The main text, title and search target ID of the $i^{th}$ history element are read from the history accumulation unit 110.

(S1506) The read main text and title are divided in units of character types to acquire a word. The character types include, for example, numbers, Japanese characters, signs, English characters and Chinese characters.

(S1507) It is determined whether the search target ID as a history element read at step S1505 is identical to T set at step S1501. If it is determined that they are identical, the program proceeds to step S1508, whereas if it is determined that they are not identical, the program proceeds to step S1510.

(S1508) The word acquired at step S1506 is added to variable X, and the program proceeds to step S1510.

(S1509) The word acquired at step S1506 is added to variable Y, which also holds a word arrangement and differs variable X, and the program proceeds to step S1510.

(S1510) Counter variable i is incremented by one, and the program returns to step S1504.

(S1511) Counter variable j, which differs from counter variable i, is reset to 0.

(S1512) It is determined whether j is smaller than the number of words held by variable X. If it is determined that j is smaller than the number of words, the program proceeds to step S1513, whereas if it is determined that j is not smaller than the number of words, the program is terminated.

(S1513) The statistical score Dj of the jth word Kj held by variable X is computed. The way of computation of statistical score Dj will be described later.

(S1514) It is determined whether Dj is greater than a preset threshold value P. If it is determined that Dj is greater than the threshold value P, the program proceeds to step S1515, whereas if it is determined that Dj is not greater than the threshold value P, the program proceeds to step S1517.

(S1515) It is determined whether word Kj is already stored in either the additional keyword accumulation unit 103 or the additional keyword candidate holding unit 112. If it is determined that word Kj is already stored in either the additional keyword accumulation unit 103 or the additional keyword candidate holding unit 112, the program proceeds to step S1517, whereas if it is determined that word Kj is not stored, the program proceeds to step S1516.

(S1516) Word Kj is added to the additional keyword candidate holding unit 112.

(S1517) Variable j is incremented by one, and the program returns to step S1512.

Statistical score Dj computed at step S1513 is given, for example, by $$Dj=(n/N)/(m/M)$$

where n: the number of times of appearance of word Kj in variable X

N: the total number of times of appearance of all words in variable X m: the number of times of appearance of word Kj in variable Y M: the total number of times of appearance of all words in variable Y If m=0, preset constant value Dmax (>P) is assigned to Dj.

Qualitatively, the statistical score Dj of a word assumes a high value if the word appears many times in the correct document corresponding to certain search target ID, and does not appear many times in the correct documents corresponding to other search target ID items. The statistical score is not necessarily given by the above expression, but may be given by any other expression. It is sufficient if the given statistical score has similar qualitative properties.

(Modification)

Referring now to FIG. 16, a modification of the embodiment will be described.

In the modification, the history accumulation unit 110, additional keyword candidate extraction unit 111 and additional keyword candidate holding unit 112, which are incorporated in the search keyword improvement apparatus shown in FIG. 1, operate on a server 1600 different from the PC on which the other units of the improvement apparatus operate. Further, the units (the history accumulation unit 110, additional keyword candidate extraction unit 111 and additional keyword candidate holding unit 112) on the server 1600 are accessed by a plurality of PCs. Namely, the search keyword improvement apparatus according to the modification incorporates the keyword input unit 101, search target presentation/designation unit 102, additional keyword accumulation unit 103, search query generation unit 104, search query transmission unit 105, search result receiving unit 106, search result list generation unit 107, presentation unit 108, correct answer determination/selection unit 109, additional keyword updating unit 113, search target accumulation unit 114, and keyword analysis unit 115. The presentation unit 108 includes the search result presentation unit 116 and menu presentation unit 117.

In this modification, the history accumulation unit 110 accumulates search histories made by a plurality of users, and the additional keyword candidate extraction unit 111 extracts additional keyword candidates from the search histories of the users. Thus, it is possible that additional keyword candidates extracted from the search histories of other users will be added to the additional keyword accumulation unit 103, and hence the user of the search keyword improvement apparatus can use these additional keywords. This means that the user of the search keyword improvement apparatus can use the apparatus more conveniently.

Since in the above-described embodiment and modification, more and more appropriate keywords are set as more and more searches are executed, the cost required for developing keywords can be reduced. Further, even when there is a change in the properties of documents as search targets, keywords that follow the changed properties are gradually set, and therefore appropriate search results can be acquired.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A search keyword improvement apparatus comprising:
a computer;
a history accumulation unit resident on the computer to accumulate first documents or indexes which correspond to the first documents and first search target identification information items which correspond to first search targets associated with keywords for searching, the first documents or the indexes and the first search target identification information items being in relationship to each other on the history accumulation unit, the first search target identification information items being used to search the first documents or indexes;
an additional keyword candidate extraction unit resident on the computer to extract a word, as a first additional keyword candidate from a new document included in the first documents or indexes;
if the new document and a new search target identification information item, which is used to search the new document, are accumulated in the history accumulation unit, then the additional keyword candidate extraction unit extracts the first additional keyword candidate when a computed statistical score for the first additional keyword candidate is greater than a preset threshold value so that a number of times of appearance of the first additional keyword candidate in the new document is greater than number of times of appearance of the first additional keyword candidate in each of the first documents or indexes other than new document;
an additional keyword accumulation unit resident on the computer to accumulate additional keywords different from the first additional keyword candidate and second search target identification information items corresponding to the additional keywords;

an additional keyword candidate holding unit resident on the computer to store additional keyword candidates including the first additional keyword candidate and different from the additional keywords and a third search target identification information item corresponding to the first additional keyword candidate;

a search query generation unit resident on the computer to generate a first search query based on an input keyword, a second search target associated with the input keyword, and one of the additional keywords which corresponds to a fourth search target identification information item corresponding to the second search target, and configured to generate a second search query based on the input keyword, the second search target, and the first additional keyword candidate which corresponds to the fourth search target identification information item;

a search result list generating unit resident on the computer to generate a first search result list including search results corresponding to the first search query and the second search query;

a first selection unit resident on the computer to select a second document as a desired search result from the first search result list; and an additional keyword updating unit resident on the computer to move, to the additional keyword accumulation unit, the first additional keyword candidate and the third search target identification information item, if the first selection unit selects the desired search result from a second search result list corresponding to the second search query, the second search result list being included in the first search result list.

2. The apparatus according to claim 1, wherein the first selection unit selects the second document from the first search result list if a user has determined that the second document is the desired search result.

3. The apparatus according to claim 2, wherein the second search target in the search query generation unit is a user selected one of the first search targets.

4. The apparatus according to claim 1, further comprising:
a keyword input unit configured to input the input keyword;
a keyword analysis unit configured to analyze a semantic class of the input keyword; and
a search target presentation unit configured to display a search target menu including the second search target in accordance with an analysis result obtained by the keyword analysis unit,
the second search target associated with the input keyword being selected from the search target menu.

5. The apparatus according to claim 1, wherein the additional keyword candidate extraction unit extracts the word as the first additional keyword candidate if a value of (n/N)/(m/M) is greater than a first threshold value, n indicating the number of times of appearance of the word in the new document, N indicating number of times of appearance of all words in the new document, m indicating number of times of appearance of the word in the first documents or indexes except for the new document, M indicating number of times of appearance of all words in the first documents or indexes except for the new document.

6. The apparatus according to claim 1, wherein the search result list generation unit includes:
a determination unit configured to determine whether there is a first search result corresponding to the second search query;

a first read unit configured to read the first search result if it is determined that there is the first search result;
a second read unit configured to read a second search result corresponding to the first search query; and
a deletion unit configured to delete, from the first search result, a document included in the second search result.

7. The apparatus according to claim 6, wherein the search result list generation unit further includes:
a reset unit configured to reset content of the first search result list to obtain a reset list; and
an update unit configured to update the first search result list by performing an operation of moving, to the reset list, a first result element of a highest rank included in the second search result, and then moving, to a position immediately after the first result element of the reset list, a second result element of a highest rank included in the first search result, and repeating the operation until all search result elements included in the first search result and the second search result are processed.

8. The apparatus according to claim 1, wherein the first selection unit includes:
a measurement unit configured to measure a time for which a third document included in the second search result list and browsed by a user is continuously displayed; and
a second selection unit configured to select the third document as the desired search result if the measured time is greater than a second threshold value.

9. The apparatus according to claim 8, wherein the first selection unit further includes:
a determination unit configured to determine whether the third document is a search result of the second search query; and
an identification unit configured to identify a fifth search target identification information item corresponding to the third document if the determination unit determines that the third document is the search result of the second search query.

10. The apparatus according to claim 1, wherein the first search result list generated by the search result list generation unit includes, in units of search results, information corresponding to one of the first search query and the second search query.

11. A server apparatus comprising:
a server;
a history accumulation unit resident on the server to accumulate first documents selected as desired search results from a search result list formed of search results, and search target identification information items which correspond to search targets associated with keywords for searching, the first documents and the search target identification information items being in relationship to each other on the history accumulation unit, the search target identification information items being used to search the first documents;
an additional keyword candidate extraction unit resident on the server to extract a word, as first additional keyword candidate from a new document included in the first documents;
if the new document and a new search target identification information item, which is used to search the new document, are accumulated in the history accumulation unit, then the additional keyword candidate extraction unit extracts the first additional keyword candidate when a computed statistical score for the first additional keyword candidate is greater than a preset threshold value so that a number of times of appearance of the first additional keyword candidate in the new document is greater than number of times of appearance of the first additional keyword candidate in each of the first documents other than new document; and an additional keyword candidate holding unit resident on the server to store the first additional keyword candidate and another search target identification information item corresponding to the first additional keyword candidate.

12. A search keyword improvement method comprising:

preparing a history accumulation unit configured to accumulate first documents or indexes which correspond to the first documents and first search target identification information items which correspond to first search targets associated with keywords for searching, the first documents or the indexes and the first search target identification information items being in relationship to each other on the history accumulation unit, the first search target identification information items being used to search the first documents or indexes;

extracting a word as first additional keyword candidate from a new document included in the first documents or indexes; if the new document and a new search target identification information item, which is used to search the new document, are accumulated in the history accumulation unit, then extracting the first additional key word candidate when a computed statistical score for the first additional keyword candidate is greater than a preset threshold value so that a number of times of appearance of the first additional keyword candidate in the new document is greater than a number of times of appearance of the first additional keyword candidate in each of the first documents or indexes other than the new document;

preparing an additional keyword accumulation unit configured to accumulate additional keywords different from the first additional keyword candidate and second search target identification information items corresponding to the additional keywords;

storing in a storage unit additional keyword candidates including the first additional keyword candidate and different from the additional keywords and a third search target identification information item corresponding to the first additional keyword candidate;

generating a first search query based on an input keyword, a second search target associated with the input keyword, and one of the additional keywords which corresponds to a fourth search target identification information item corresponding to the second search target;

generating a second search query based on the input keyword, the second search target, and the first additional keyword candidate which corresponds to the fourth search target identification information item;

generating a first search result list including search results corresponding to the first query and the second query;

selecting a second document as a desired search result from the first search result list; and moving, to the additional keyword accumulation unit, the first additional keyword candidate and the third search target identification information item, if the first selection unit selects the desired search result from a second search result list corresponding to the second search query, the second search result list being included in the first search result list.

13. A method comprising:

preparing a history accumulation unit configured to accumulate first documents selected as desired search results from a search result list formed of search results, and search target identification information items which correspond to search targets associated with keywords for searching, the first documents and the search target identification information items being in relationship to each other on the history accumulation unit, the search target identification information items being used to search the first documents;

extracting a word, as first additional keyword candidate from a new document included in the first documents; if the new document and a new search target identification information item, which is used to search the new document, are accumulated in the history accumulation unit, then extracting the first additional key word candidate when a computed statistical score for the first additional keyword candidate is greater than a preset threshold value so that a number of times of appearance of the first additional keyword candidate in the new document is greater than a number of times of appearance of the first additional keyword candidate in each of the first documents other than the new document; and storing in a storage unit the additional keyword candidates including the first additional keyword candidate and different from the additional keywords and another search target identification information item corresponding to the first additional keyword candidate.

* * * * *